US012639691B2

(12) United States Patent
Vorhees et al.

(10) Patent No.: US 12,639,691 B2
(45) Date of Patent: May 26, 2026

(54) WEIGHT-BASED LOCATION TRACKING

(71) Applicant: TOSHIBA GLOBAL COMMERCE SOLUTIONS, INC., Durham, NC (US)

(72) Inventors: Kevin H. Vorhees, Raleigh, NC (US); Deepshika G. Kovvali, Morrisville, NC (US); Gregory M. Hardy, Greensboro, NC (US); Bradley S. Kerr, Raleigh, NC (US); Shanmukha Ram Peri, Clemson, SC (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 0 days.

(21) Appl. No.: 18/163,752

(22) Filed: Feb. 2, 2023

(65) Prior Publication Data

US 2024/0273500 A1     Aug. 15, 2024

(51) Int. Cl.
G06Q 20/20          (2012.01)
G06Q 20/18          (2012.01)
G06Q 30/0601        (2023.01)

(52) U.S. Cl.
CPC ........... G06Q 20/208 (2013.01); G06Q 20/18 (2013.01); G06Q 30/0639 (2013.01)

(58) Field of Classification Search
CPC ... G06Q 20/208; G06Q 20/18; G06Q 30/0639
See application file for complete search history.

(56) References Cited

U.S. PATENT DOCUMENTS 5,750,937  A  *   5/1998   Johnson ............. G01G 23/3707
                                                178/18.05
7,040,455  B2 *   5/2006   Bogat ..................... A47F 9/047
                                                186/59
7,126,065  B2 *  10/2006   Petrucelli ............... G01G 19/44
                                                177/177
7,434,459  B2 *  10/2008   Schmidt ................ G06F 3/0414
                                                702/139
7,575,162  B1 *   8/2009   Malchak ............. G07G 1/0054
                                                235/383
9,033,227  B2 *   5/2015   Kobres .................. G01G 23/01
                                                235/383
10,810,540 B1 *  10/2020   Gopal .................... G01G 19/42
                           (Continued)

OTHER PUBLICATIONS

Lin et al. (Feb. 2022) On-Shelf Load Cell Calibration for Positioning and Weighing Assisted by Activity Detection: Smart Store Scenario. IEEE Sensors Journal, vol. 22, No. 4.*

*Primary Examiner* — Peter Ludwig
(74) *Attorney, Agent, or Firm* — Patterson + Sheridan, LLP; Gero G. McClellan

(57)          ABSTRACT

Techniques are provided for weight-based location tracking. In one embodiment, the techniques involve retrieving, via an item tracker, item data of each item in a transaction at a self-checkout system, wherein the item data includes incremental weight measurements, location data, and a total weight of the items in the transaction, generating, via the item tracker, a grouping of items based on the location data, identifying, via the item tracker, a decrease in the total weight of the items in the transaction, and matching, via the item tracker, the decrease in the total weight to a weight of the grouping of items, wherein the weight of the grouping of items is determined based on the incremental weight measurements.

11 Claims, 4 Drawing Sheets

(56)        References Cited

U.S. PATENT DOCUMENTS

| 2004/0168836 A1* | 9/2004 | Petrucelli | G01G 17/08 |
| | | | 177/199 |
| 2008/0005036 A1 | 1/2008 | Morris | |
| 2013/0232021 A1* | 9/2013 | Hagglund | G01G 19/4144 |
| | | | 702/173 |
| 2016/0252387 A1* | 9/2016 | Laird | G01G 19/035 |
| | | | 177/1 |
| 2018/0028094 A1* | 2/2018 | Lee | A61B 5/4023 |
| 2021/0081914 A1* | 3/2021 | Nelms | G06Q 30/0641 |
| 2021/0124946 A1* | 4/2021 | Mirza | G06T 7/292 |
| 2021/0148751 A1* | 5/2021 | Yadai | G01G 19/52 |
| 2022/0120602 A1* | 4/2022 | Polish | G01G 23/01 |

* cited by examiner

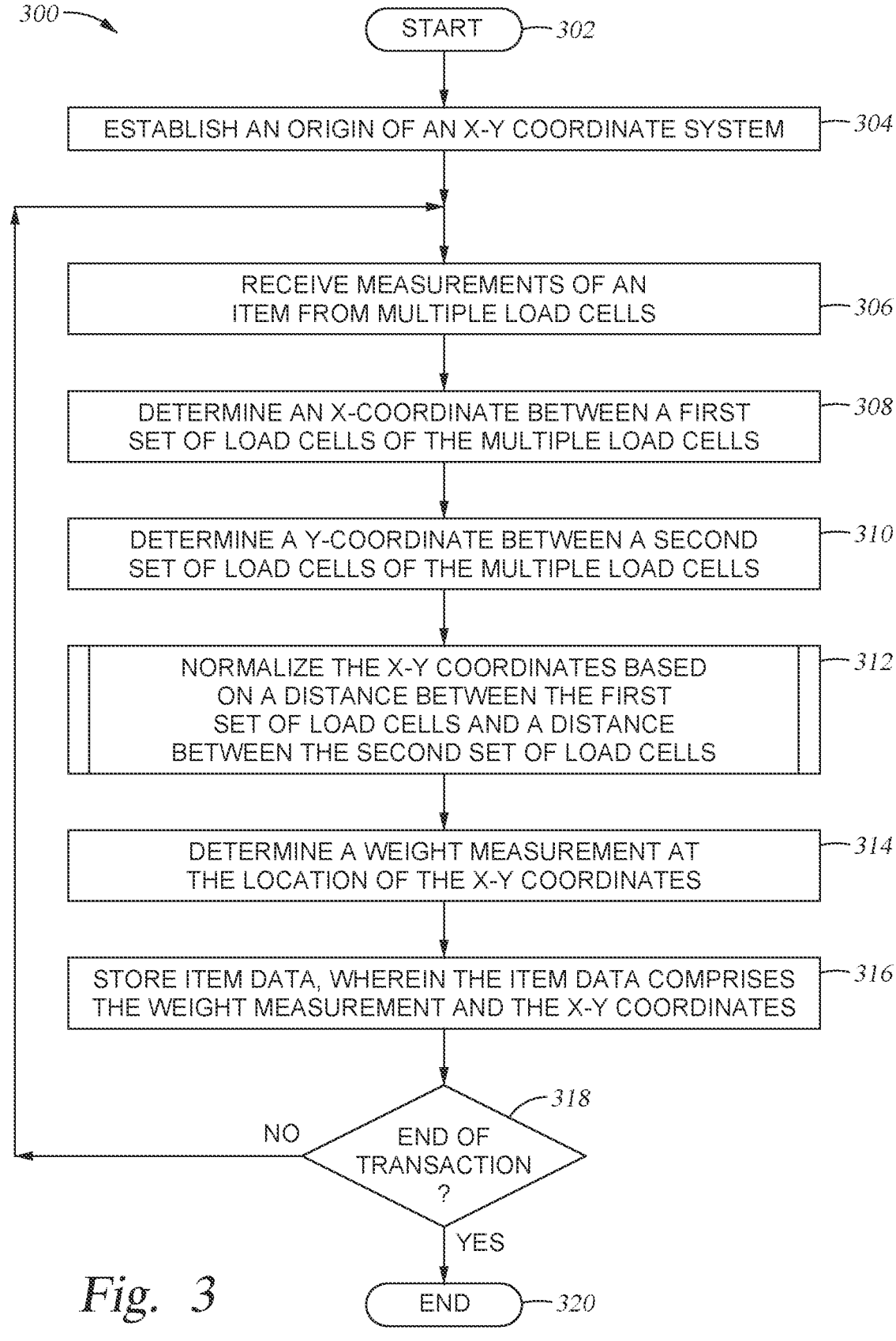

*300*

START — *302*

ESTABLISH AN ORIGIN OF AN X-Y COORDINATE SYSTEM — *304*

RECEIVE MEASUREMENTS OF AN ITEM FROM MULTIPLE LOAD CELLS — *306*

DETERMINE AN X-COORDINATE BETWEEN A FIRST SET OF LOAD CELLS OF THE MULTIPLE LOAD CELLS — *308*

DETERMINE A Y-COORDINATE BETWEEN A SECOND SET OF LOAD CELLS OF THE MULTIPLE LOAD CELLS — *310*

NORMALIZE THE X-Y COORDINATES BASED ON A DISTANCE BETWEEN THE FIRST SET OF LOAD CELLS AND A DISTANCE BETWEEN THE SECOND SET OF LOAD CELLS — *312*

DETERMINE A WEIGHT MEASUREMENT AT THE LOCATION OF THE X-Y COORDINATES — *314*

STORE ITEM DATA, WHEREIN THE ITEM DATA COMPRISES THE WEIGHT MEASUREMENT AND THE X-Y COORDINATES — *316*

END OF TRANSACTION ? — *318*

NO

YES

*Fig. 3*

END — *320*

*400*

START — *402*

RETRIEVE ITEM DATA — *404*

GENERATE A GROUPING OF ITEMS AND GROUPING DATA BASED ON THE ITEM DATA — *406*

IDENTIFY A DECREASE IN THE TOTAL WEIGHT — *408*

DECREASE IN TOTAL WEIGHT CAN BE MATCHED WITH A GROUPING OF ITEMS ? — *410*

YES

NO

GENERATE NOTIFICATION — *412*

END — *414*

WEIGHT-BASED LOCATION TRACKING

BACKGROUND

Traditional self-checkout systems are often used in retail settings to facilitate purchases without the aid of an employee. In a typical transaction using a self-checkout system, a customer scans an item for purchase, and places the item in a shopping bag supported by a bag rack of a bagging station. This process is repeated until all items have been scanned and placed in shopping bags. Afterwards, the customer uses the self-checkout system to pay for the transaction. However, if the customer deviates from the typical transaction (e.g., by replacing or removing items already in the shopping bag), traditional self-checkout systems may not identify the deviation, or may pause the transaction and call for employee assistance.

BRIEF DESCRIPTION OF THE SEVERAL VIEWS OF THE DRAWINGS

FIG. 3 illustrates a flowchart of a method for generating item data, according to one embodiment.

DETAILED DESCRIPTION

Embodiments of the present disclosure improve upon self-checkout systems by enabling weight-based location tracking of individual items in a bagging station. In one embodiment, a user of a self-checkout system enters items into a transaction, and places the items on a bagging station of the self-checkout system. The weights and locations of the items are determined from load cell measurements such that any grouping of the items can be readily identified if removed from the bagging station before completion of the transaction.

In one embodiment, a grouping of the items is identified using the locations of the items in the grouping. When the grouping is removed from the bagging station, the resultant decrease in the total weight of the items on the bagging station is compared to a recorded weight of the grouping. If a match cannot be made between the decrease in total weight of the items and the weight of the grouping, a notification is generated to request assistance at the self-checkout system. Otherwise, the transaction can proceed without interference.

One benefit of the disclosed embodiments is to improve the speed of transactions by preventing self-checkout systems from interfering with allowed deviations from typical transactions. For example, during a transaction, the user may attempt to remove a shopping bag that contains items from a bagging station of the self-checkout system to make room for more items to be placed onto the bagging station. Traditional self-checkout systems interpret this bag removal as an event that requires intervention by an employee (e.g., a nefarious action), while the disclosed embodiments can provide the flexibility for the transaction to continue without such intervention.

Figure 1:
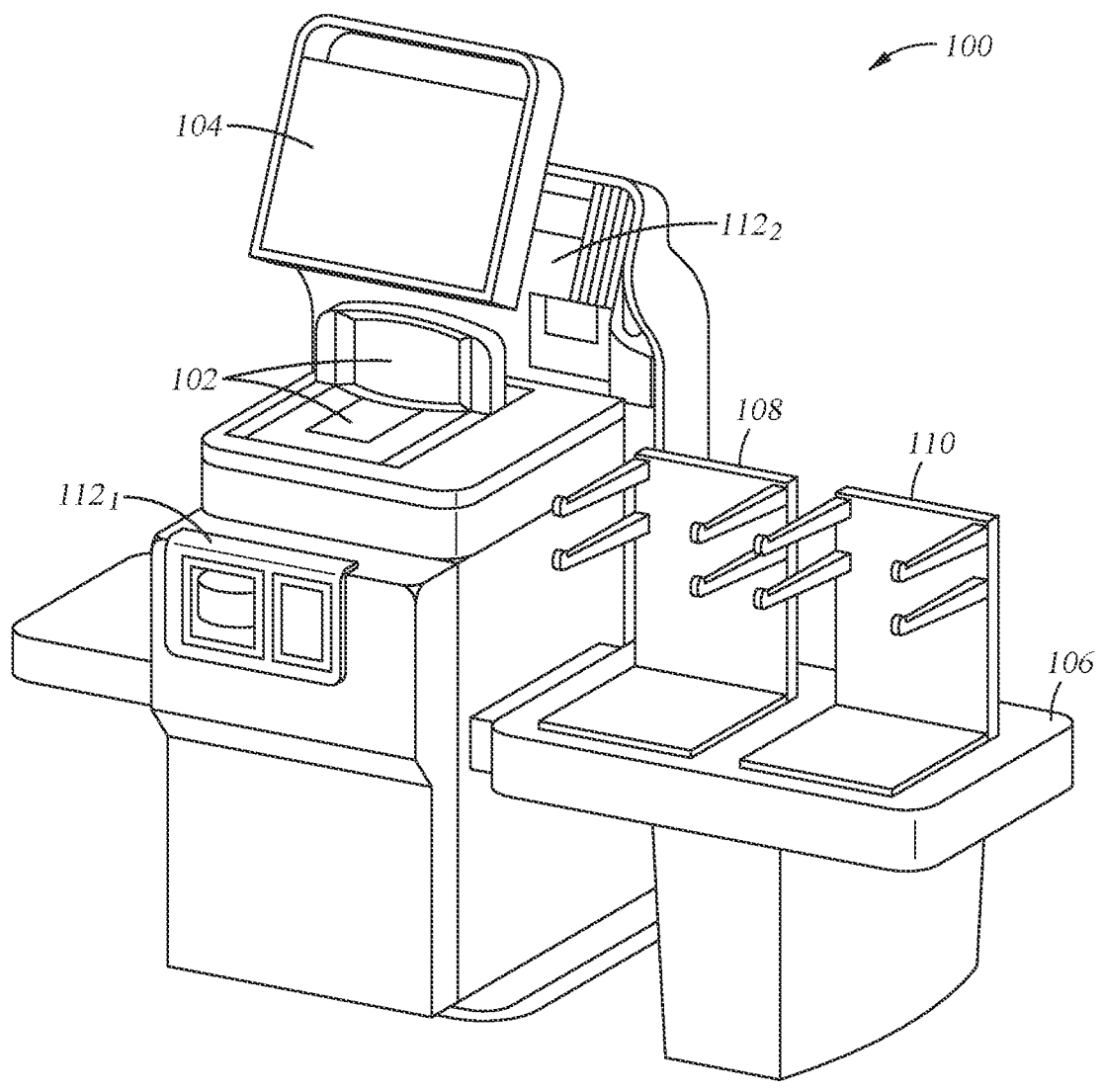
FIG. 1 illustrates a self-checkout system, according to one embodiment.

FIG. 1 illustrates a self-checkout system 100, according to one embodiment. In one embodiment, the self-checkout system 100 is a kiosk or point of sale (POS) device that is used to purchase items (e.g., clothes, food, home improvement items, and the like) in a retail environment.

In the illustrated embodiment, the self-checkout system 100 includes scanner 102, display 104, bagging station 106, bag rack 108, and bag rack 110. Not all components of the self-checkout system are shown.

The scanner 102 can be used to scan bar codes, or other item identifiers, to input corresponding items into a transaction. The display 104 can present a graphical user interface (GUI) that facilitates the transaction. In one embodiment, the display 104 includes a touchscreen that can be used to show transaction details, and to select payment methods.

The transaction details can include a list of quantities, descriptions, and prices of the items entered into the transaction via the scanner 102. The transaction details can also include a sub-total, taxes due, and a total amount of the transaction calculated by the self-checkout system 100. The payment options shown on the display 104 can include options for payment via cash, credit card, debit card, gift card, and the like.

After scanning an item, a user may place the item into a shopping bag (not shown) supported by bag rack 108 or bag rack 110 of the bagging station 106. A structure and operation of the bagging station 106 is described in further detail in FIG. 2. In one embodiment, the self-checkout system 110 determines the location of the center of gravity of the item, and the weight that the item exerts on the bagging station 106 at the location. This process is described in further detail in FIG. 3.

During the transaction, the self-checkout system 100 can continue to monitor the bagging station 106 for changes in item weight and location. If there are changes that the self-checkout system 100 cannot account for, the self-checkout system 100 can generate an alert for an employee, or a notification for the shopper. This process is described in further detail in FIG. 4. After all items have been scanned, the user can complete the transaction by payment via payment terminal 1121 or payment terminal 1122.

Figure 2:
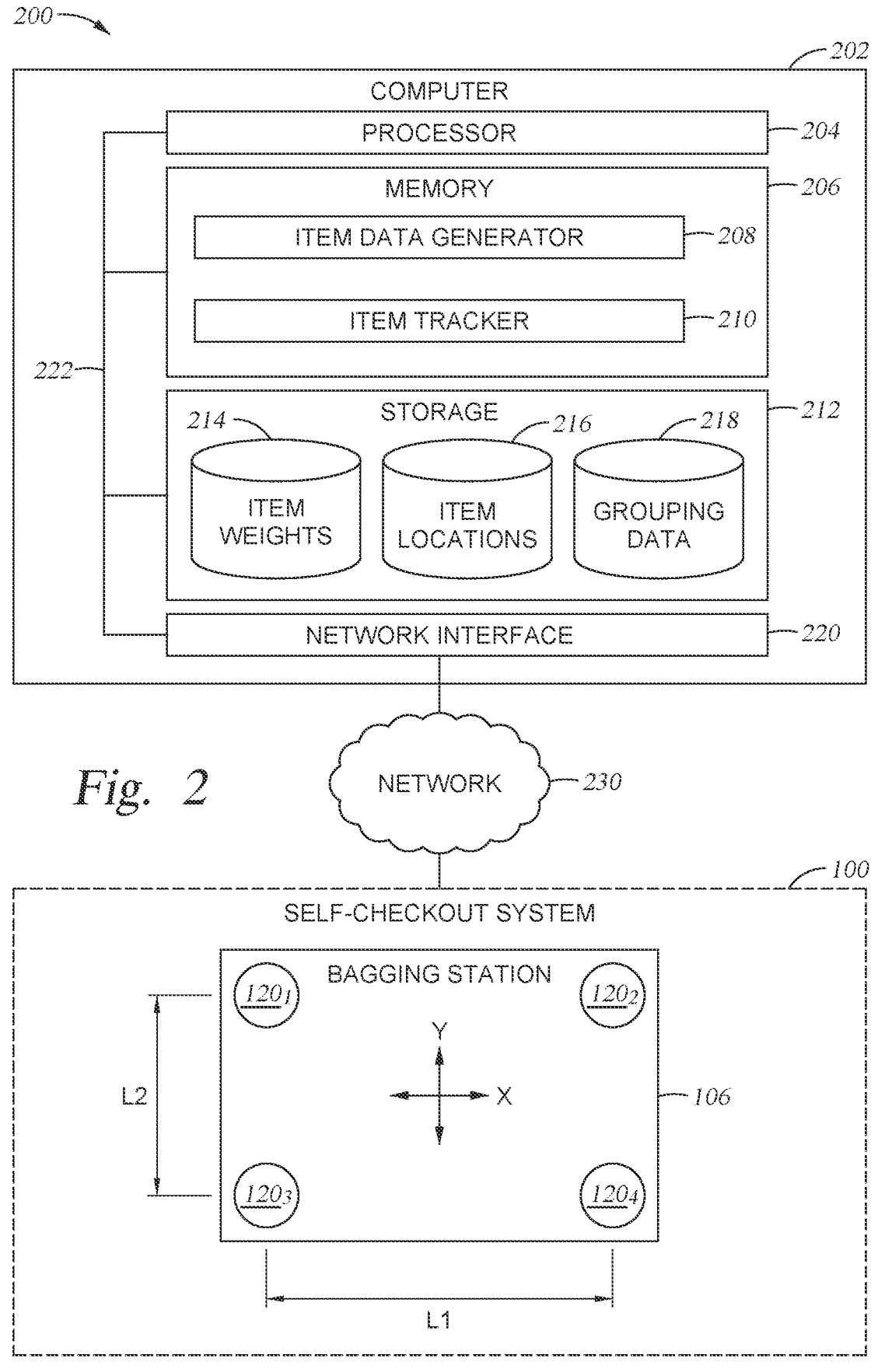
FIG. 2 illustrates an item location tracking environment, according to one embodiment.

FIG. 2 illustrates an item location tracking environment 200, according to one embodiment. FIG. 3 illustrates a flowchart of a method 300 for generating item data, according to one embodiment. FIG. 2 is explained in conjunction with FIG. 3.

In the embodiment illustrated in FIG. 2, the item location tracking environment 200 includes a computer 202 wirelessly coupled to the self-checkout system 100 via a network 230. In another embodiment, however, the computer 202 is integrated into the self-checkout system 100.

In one embodiment, the computer 202 includes a processor 204 that obtains instructions and data via a bus 222 from memory 206 or storage 212. Not all components of the computer 202 are shown. The computer 202 is generally under the control of an operating system (OS) suitable to perform or support the functions or processes disclosed herein. For example, the computer 202 can run the firmware and software that enables operation of the scanner 102 and display 104, calculates the transaction details, facilitates payment, enables functions of the bagging station 106, and the like.

The processor 204 is a programmable logic device that performs instruction, logic, and mathematical processing, and may be representative of one or more CPUs. The processor 204 may execute one or more algorithms, instruction sets, or software applications in the memory or storage to perform the functions or processes described herein.

The computer 202 also includes a network interface 220 connected to the bus 222. The network interface 220 may be any type of network communications device allowing the computer to communicate with other computers via the network 230. The network interface 220 may exchange data with another network interface of another computer coupled to the self-checkout system 100 via the network 230. In one embodiment, the exchanged data includes at least one weight measurement of the bagging station 106.

The memory 206 and storage 212 can be representative of hard-disk drives, solid state drives, flash memory devices, optical media, and the like. The storage 212 may also include structured storage (e.g., a database). In addition, the memory 206 and the storage 212 may be considered to include memory physically located elsewhere. For instance, the included memory may be located on another computer communicatively coupled to the computer 202 via the bus or network 230.

As shown in FIG. 2, the memory 206 includes item data generator 208 and item tracker 210. In one embodiment, the item data generator 208 and item tracker 210 are each sets of computer instructions or algorithms executed by the processor 204 to perform the functions described herein.

A method 300 performed by the item data generator 208 begins at block 302. As discussed above, during a transaction conducted via the self-checkout system 100, a user can scan an item, and place the item on the bagging station 106, or in a shopping bag supported by a bag rack of the bagging station 106.

In the embodiment illustrated in FIG. 2, the bagging station 106 includes load cells 120$_{1-4}$. A load cell is a transducer that measures the weight of an object by converting an input force exerted on the load cell to a proportional output electrical signal. Examples of load cells include strain gauges, hydraulic load cells, pneumatic load cells, and capacitive load cells. In one embodiment, the load cells 120$_{1-4}$ used in the bagging station 106 are strain gauges.

The load cells 120$_{1-4}$ can be disposed on, arranged within, or disposed beneath any surface of the bagging station 106. In one embodiment, load cells are arranged on boundaries near the edges or corners of the bagging station 106 to maximize the surface area that is measured by the load cells.

As illustrated in FIG. 2, the load cells 120$_{1-4}$ are arranged near the corners of a surface of the bagging station 106. Although four load cells are shown in this embodiment, the item data generator 208 can also perform the functions described herein when the bagging station 106 includes at least three load cells, which enables use of a two-dimensional coordinate system as described below.

At block 304, the item data generator 208 establishes an origin of an x-y coordinate system. In one embodiment, the item data generator 208 sets the origin using predetermined data that is entered into the item data generator 208 (and the item tracker 210) prior to installation or operation of the self-checkout system 100. The predetermined data can include the dimensions of a surface of the bagging station 106, the coordinates of bag rack 108 and bag rack 110, the coordinates of each of the load cells 120$_{1-4}$, the location of one load cell (e.g., 120$_1$) along with the distance (e.g., L1 and L2) to other load cells, and the like.

The origin can be set at any point on a surface of the bagging station 106. For instance, the origin is set at the center of a surface of the bagging station 106, or at a position equidistant from each of the load cells 120$_{1-4}$.

At block 306, the item data generator 208 receives measurements of an item from multiple load cells. In the embodiment illustrated in FIG. 2, the measurements represent individual forces exerted on each of the load cells 120$_{1-4}$ by the item placed on the bagging station 106.

At block 308, the item data generator 208 determines an x-coordinate between a first set of the load cells of the multiple load cells. The x-coordinate can represent the center of gravity of the item on the x-axis. In one embodiment, the x-coordinate is determined by dividing the difference in the outputs from a right-most set of load cells and a left-most set of load cells by the outputs of all the load cells. In the illustrated embodiment, the x-coordinate is calculated as follows:

$X=(B+D-A-C)/(A+B+C+D)$, where A is the output of load cell 102$_1$, B is the output of load cell 102$_2$, C is the output of load cell 102$_3$, and D is the output of load cell 102$_4$.

At block 310, the item data generator 208 determines a y-coordinate between a second set of load cells of the multiple load cells. The y-coordinate can represent the center of gravity of the item on the y-axis. In one embodiment, the y-coordinate is determined by dividing the difference in the outputs from an upper-most set of load cells and a bottom-most set of load cells by the outputs of all the load cells. In the illustrated embodiment, the y-coordinate is calculated as follows:

$Y=(A+B-C-D)/(A+B+C+D)$, where A is the output of load cell 102$_1$, B is the output of load cell 102$_2$, C is the output of load cell 102$_3$, and D is the output of load cell 102$_4$.

At block 312, the item data generator 208 can, optionally, normalize the x-y coordinates based on a distance between the first set of load cells and a distance between the second set of load cells. In the embodiment illustrated in FIG. 2, the item data generator 208 can normalize the x-coordinate applying a scaling factor as follows: $X_{normalized}=X*L1/2$, where L1 is the distance between load cell 120$_1$ and load cell 120$_2$, or load cell 120$_3$ and load cell 120$_4$. The item data generator 208 can normalize the y-coordinate applying a scaling factor as follows: $Y_{normalized}=Y*L2/2$, where L2 is the distance between load cell 120$_1$ and load cell 120$_3$, or load cell 120$_2$ and load cell 120$_4$.

At block 314, the item data generator 208 determines a weight measurement at the location of the x-y coordinates. In one embodiment, the item data generator 208 determines the weight measurement by averaging and scaling the outputs of the load cells 120$_{1-4}$. In another embodiment, the item data generator 208 determines the weight measurement from the outputs of a subset of the load cells 120$_{1-4}$.

At block 316, the item data generator 208 stores item data, wherein the item data comprises the weight measurement and the x-y coordinates. In the embodiment illustrated in FIG. 2, the item data generator 208 stores the item identification and the weight measurement in item weights 214, and stores the item identification and the x-y coordinates in item locations 216, in the storage 212. The load cell measurements used to determine the weight measurement can also be stored in the item weights 214. In one embodiment, the item data is stored as a lookup table that maps an identification of the item to a respective item weight and item location. The item data can be used to determine groupings of items and grouping data 218, as described in FIG. 4.

The item data generator 208 can also determine the total weight of all items in the transaction, and store the total weight (as well as the individual weights of each item) in the item weights 214. The total weight can be updated in real-time whenever an item is added to, or removed from, a shopping bag or the bagging station 106.

At block 318, upon determining that the transaction has not ended, the method 300 proceeds to block 306, where the item data generator 208 operates as discussed above. Returning to block 318, if the item data generator 318 determines that the transaction has ended, the method 300 proceeds to block 320 where the method 300 ends.

Figure 4:
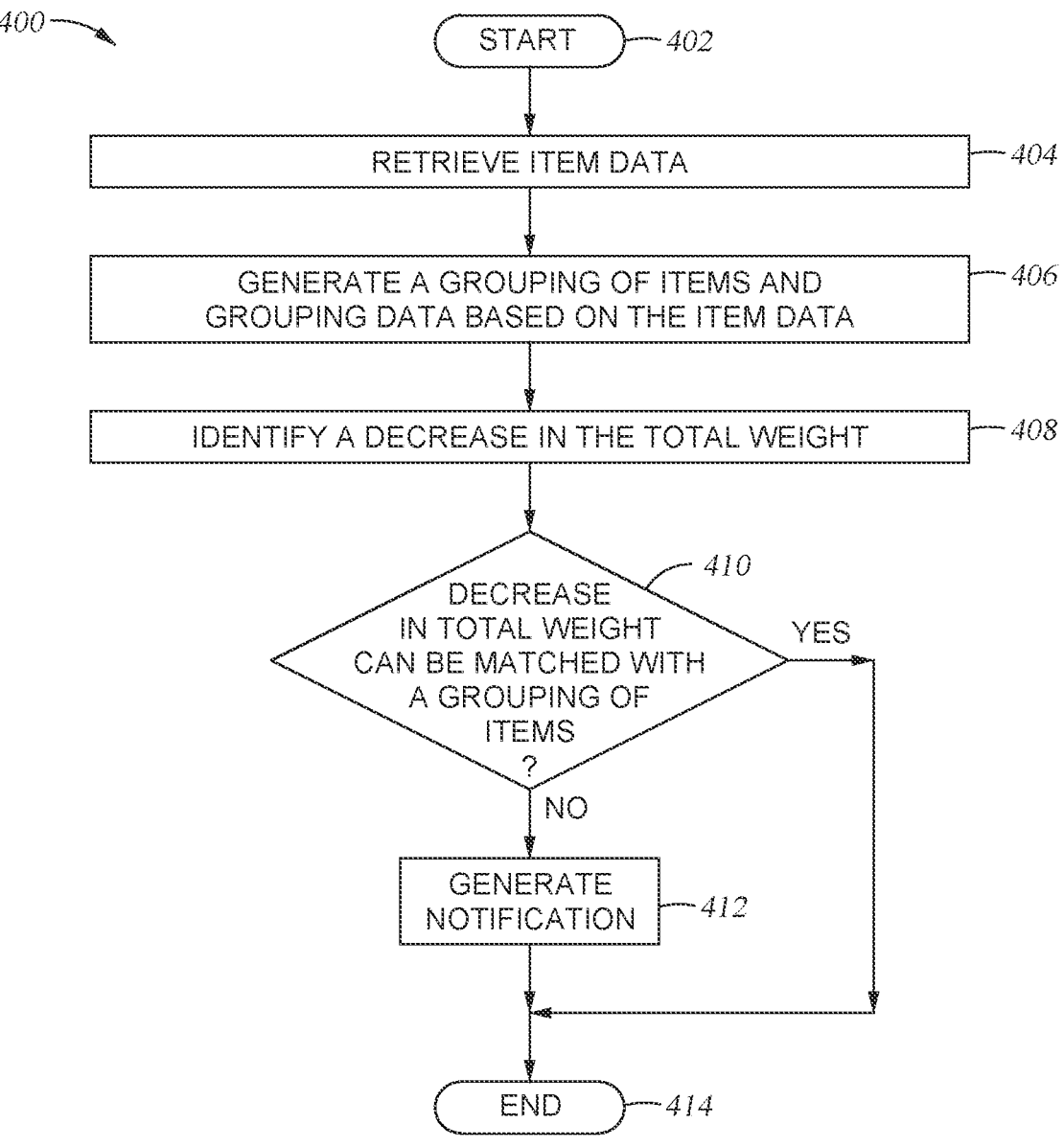
FIG. 4 illustrates a flowchart of a method for tracking the location of an item, according to one embodiment.

FIG. 4 illustrates a flowchart of a method 400 for tracking the location of an item, according to one embodiment. The method 400 begins at block 402.

At block 404, the item tracker 210 retrieves the item data from the storage 212. As discussed above, the item data can include an incremental weight measurement, location data, and a total weight of at least one item in a transaction of the self-checkout system. The location data can include the x-y coordinates of a center of gravity of each item in the transaction. In one embodiment, the item tracker 210 retrieves the item data from the item weights 214 and item locations 216 in storage 212.

At block 406, the item tracker 210 generates a grouping of items, and grouping data 218, based on the item data. In one embodiment, a grouping of items is a software representation of any individual item of the transaction, or any combination of items in close physical proximity, on the bagging station 106.

In one embodiment, a first grouping of items represents all of the items that are placed into the same shopping bag. In this embodiment, the item tracker 210 identifies an overlap of the location data of items in the transaction with the predetermined location of the bag rack that supports the shopping bag. That is, as discussed above, predetermined data that includes the coordinates of each bag rack can be entered into the item tracker 210 prior to installation or operation of the self-checkout system 100. The item tracker 210 can compare the x-y coordinates of each item of the transaction with the coordinates of the bag racks to determine which bag racks support the shopping bags that contain the items. In this manner, each shopping bag that contains items is considered to contain a separate grouping of items.

In one embodiment, a second grouping of items represents a subset of the items that are placed into a shopping bag. In this embodiment, the item tracker 210 generates multiple groupings for each possible combination of items in the shopping bag. For instance, if the shopping bag contains 4 items, then a grouping may include any 1-3 of the items. The item tracker 210 can identify the shopping bag that contains the items using the same process as performed for the first grouping.

In one embodiment, a third grouping of items represents one item, or multiple items placed next to each other, directly on the surface of the bagging station 106. In this embodiment, the item tracker 210 determines the distances between each item using the x-y coordinates of the items, and then compares the distances between the items to a threshold to determine whether the multiple items are in close physical proximity. The item tracker 210 can generate a grouping for any items that are in close physical proximity. This process may also be used by the item tracker 210 to determine the second grouping of items.

In addition to generating the groupings, the item tracker 210 can generate the grouping data 218. In one embodiment, the grouping data 218 includes grouping identifications, and corresponding weights of each grouping. The item tracker 210 can determine the grouping data 218 using the item data. When the grouping includes only one item, the weight and location of the grouping is the same as the weight and location of the item as stored in the item weights 214 and item locations 216. In one embodiment, when a grouping includes multiple items, the item data generator 208 calculates the weight of a given grouping by summing the incremental weights of each item of the grouping.

The grouping data 218 can also include a grouping location (e.g., x-y coordinates, or a given bag rack) that identifies where the grouping of items is located on the bagging station 106. If in the form of x-y coordinates, the grouping location can indicate the center of gravity of a grouping. In one embodiment, the item tracker 210 can generate a grouping location using the load cell measurements corresponding to each item in the group. The grouping locations can be determined in the same manner as the item locations, as discussed above.

The grouping locations can also be determined using the weight measurements and the x-y coordinates of each item of the grouping. For instance, for each item in the grouping, the item tracker 210 can determine the distance between the origin of the x-y coordinate system and the x-y coordinates of the item. The item tracker 210 can then calculate moment of the item from the distance and the item weight. When the moments of all items in the grouping have been calculated, the item tracker 210 can determine the center of gravity of the grouping by dividing the sum of the moments by the sum of the weights of the items in the grouping.

In one embodiment, the item tracker 210 stores the groupings and grouping data 218 in the storage 212. The grouping data 218 can also be stored as a lookup table that maps an identification of the groupings to respective grouping weights. When a grouping includes only one item, the grouping data 218 may include the same information for the item as is stored in the item weights 214 and item locations 216. However, in such cases, the grouping data 218 can also link to the item weights 214 to avoid replicating data.

At block 408, the item tracker 210 identifies a decrease in the total weight of all the items in the transaction. The decrease in total weight can occur, for example, when a user removes an item, or a shopping bag containing items, from the bagging station 106. In one embodiment, the item tracker 210 identifies the decrease in total weight by monitoring the real-time total weight from the item data. In another embodiment, the item tracker 210 can identify the decrease in total weight from a signal received from the item data generator 208 when the total weight changes. In yet another embodiment, the item tracker 210 can identify the decrease in total weight by comparing a sum of the individual weights of all items in the item weights 214 to a present measured weight from all the load cells $120_{1-4}$.

At block 410, the item tracker 210 determines whether the decrease in total weight can be matched with a grouping of items. In one embodiment, the item tracker 210 performs the matching process by comparing the magnitude of the decrease in total weight to the weight of the groupings in the grouping data 218.

The item tracker 210 can further match the decrease in total weight to a grouping of items by comparing a location of removed items to the location of a grouping stored in the grouping data 218, or to item locations stored in the item locations 216. For instance, when the items are removed from the bagging station 106, the item tracker 210 can calculate the incremental weight of the removed items as the difference between present load cell measurements (which do not include the weight of the removed grouping of items) and the load cell measurements stored in the item weights 214 or grouping data 218. The item tracker 210 can then use these incremental weights to determine the x-y coordinates for each of the removed items in a manner similar to determining the x-y coordinates for individual items, as discussed above.

In one embodiment, the item tracker 210 matches the decrease in total weight to the grouping of items when the x-y coordinates of the removed items overlap with the x-y coordinates of a grouping of items, or overlap with the location of a given bag rack holding the shopping bag that contains the items, as indicated in the grouping data 218 or the item locations 216.

In another embodiment, the item tracker 210 can perform the matching process while accounting for removed items that are relocated to another position on the bagging station 106. For example, a user may take one or more items out of a shopping bag at bag rack 108, and place the items into a shopping bag at bag rack 110. In this instance, in a manner similar to the processes discussed above, the item tracker 210 can track the weight and location of the removed items, and generate new weight and location data for the items when they are returned to the bagging station 106. The item tracker 210 can then match the weight of the removed items to the weight of the returned items, and update the location of the returned items in the item weights 214, item locations 216, and grouping data 218.

Upon determining that the decrease in total weight cannot be matched to the grouping of items, the method 400 proceeds to block 412. At block 412, the item tracker 210 generates a notification for the self-checkout system 100. In one embodiment, the notification is a signal, or an alarm, that requests assistance from an employee at the self-checkout system 100. In another embodiment, the notification triggers the display of a message that requests assistance from the user. The message can be presented on the display 104 to inform the user that at least one item, or a shopping bag containing the items, has been improperly removed from the bagging station 106. The display 104 can also present the user the option to return the items to the bagging station 106, or to remove the items from the transaction.

Returning to block 410, upon determining that the decrease in total weight can be matched to the grouping of items, the method 400 proceeds to block 414, where the method 400 ends.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to the described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:

determining, via a data generator component of a computer coupled to a self-checkout system, x-coordinate and y-coordinates of each item in a transaction at the self-checkout system using first, second, third, and fourth loads cell arranged at corners of a bagging station, the first, second, third, and fourth loads each comprising a transducer that measures the weight of an object by converting an input force exerted on a respective load cell to a proportional output electrical signal, wherein each of the output electric signals are sent from the transducer to the computer, wherein the x-coordinate is determined as a function of the output of the first load cell (A), the output of the second load cell (B), the output of the third load cell (C), and the output of a fourth load cell (D), such that:

$$X=(B+D-A-C)/(A+B+C+D),$$

wherein the y-coordinate is determined as a function of the output of the first load cell (A), the output of the second load cell (B), the output of the third load cell (C), and the output of the fourth load cell (D), such that:

$$Y=(A+B-C-D)/(A+B+C+D);$$

generating, via the item data generator component of the computer, item data of each item in the transaction at the self-checkout system, wherein the item data includes incremental weight measurements, location data, and a total weight of the items in the transaction, the location data including the two-dimensional coordinates comprising the x-coordinate and the y-coordinate, wherein the item data generator is configured to normalize the x-coordinate and the y-coordinate based on defined distances between the first, second, third, and fourth load cells;

generating a grouping of items based on the x-coordinate and the y-coordinate of each of the items, wherein the grouping of items includes only a subset of the items of the transaction;

determining a combined weight of the grouping of items by determining, and then summing the incremental weights of each item of the grouping;

identifying, via the first, second, third, and fourth load cells, after determining the combined weight of the grouping of items, a decrease in the total weight of the items in the transaction as a result of the grouping of items being moved away from the bagging station of the self-checkout system, or from a first bag rack on the bagging station to a second bag rack on the bagging station, the decrease corresponding to an incremental weight of the grouping of items being moved, wherein the grouping of items is moved away so as to be replaced, on the bagging station, with one or more remaining items in the transaction, wherein the grouping of items is permitted to be removed from the bagging station without requiring attendant authorization;

identifying two-dimensional coordinates of the grouping of items being moved, by operation of the computer and based on measurements, of the grouping of items, from the first, second, third, and fourth load cells;

matching the decrease in the total weight to the combined weight of the grouping of items, based on the identifying, for the two-dimensional coordinates of the grouping of items, a match in the location data; and completing the transaction including each of the items based on the matching and without generating a false-positive notification to request assistance, wherein the completed transaction includes the grouping of items and the one or more remaining items.

2. The method of claim 1, wherein identifying the match in the location data comprises:

matching, via an item tracker device, a location of items corresponding to the decrease in the total weight to a location of the grouping of items.

3. The method of claim 1, wherein the decrease is identified by an item tracker device configured to, upon determining that the decrease in the total weight cannot be matched with the weight of the grouping of items, generate a notification to request assistance.

4. The method of claim 1, wherein the grouping of items comprises a software representation of at least one item in the transaction that is located in a shopping bag or on a surface of the bagging station.

5. The method of claim 1, wherein the item data is generated via the item data generator component of the computer configured to:

establish an origin of an x-y coordinate system;

receive measurements of each item from the multiple load cells;

determine a weight measurement at the location of the x-coordinate and the y-coordinate; and store the item data.

6. A system, comprising:

one or more computer processors; and memory or storage comprising an algorithm or computer instructions, which when executed by the one or more computer processors, performs an operation comprising:

determining, via a data generator component of the one or more computer processors coupled to a self-checkout system, x-coordinate and y-coordinates of each item in a transaction at a self-checkout system using first, second, third, and fourth loads cell arranged at corners of a bagging station, the first, second, third, and fourth loads each comprising a transducer that measures the weight of an object by converting an input force exerted on a respective load cell to a proportional output electrical signal, wherein each of the output electric signals are sent from the transducer to the one or more computer processors, wherein the x-coordinate is determined as a function of the output of the first load cell (A), the output of the second load cell (B), the output of the third load cell (C), and the output of a fourth load cell (D), such that:

$$X=(B+D-A-C)/(A+B+C+D),$$

wherein the y-coordinate is determined as a function of the output of the first load cell (A), the output of the second load cell (B), the output of the third load cell (C), and the output of the fourth load cell (D), such that:

$$Y=(A+B-C-D)/(A+B+C+D);$$

generating, via the item data generator component, item data of each item in the transaction at the self-checkout system, wherein the item data includes incremental weight measurements, location data, and a total weight of the items in the transaction, the location data including two-dimensional coordinates comprising the x-coordinate and the y-coordinate, wherein the item data generator is configured to normalize the x-coordinate and the y-coordinate based on defined distances between the first, second, third, and fourth load cells;

generating a grouping of items based on the x-coordinate and the y-coordinate of each of the items, wherein the grouping of items includes only a subset of the items of the transaction;

determining a combined weight of the grouping of items;

identifying, after determining the combined weight of the grouping of items, a decrease in the total weight of the items in the transaction as a result of the grouping of items being moved away from a bagging station of the self-checkout system, or from a first bag rack on the bagging station to a second bag rack on the bagging station, the decrease corresponding to an incremental weight of the grouping of items being moved;

identifying, via the first, second, third, and fourth load cells, two-dimensional coordinates of the grouping of items being moved, based on measurements, of the grouping of items, from the first, second, third, and fourth load cells, wherein the grouping of items is moved away so as to be replaced, on the bagging station, with one or more remaining items in the transaction, wherein the grouping of items is permitted to be removed from the bagging station without requiring attendant authorization;

matching the decrease in the total weight to the combined weight of the grouping of items, based on identifying, for the two-dimensional coordinates of the grouping of items, a match in the location data; and completing the transaction including each of the items based on the matching and without generating a false-positive notification to request assistance, wherein the completed transaction includes the grouping of items and the one or more remaining items.

7. The system of claim 6, wherein identifying the match in the location data comprises:

matching, via an item tracker, a location of items corresponding to the decrease in the total weight to a location of the grouping of items.

8. The system of claim 6, wherein the decrease is identified by an item tracker configured to, upon determining that the decrease in the total weight cannot be matched with the weight of the grouping of items, generate a notification to request assistance.

9. The system of claim 6, wherein the grouping of items comprises a software representation of at least one item in the transaction that is located in a shopping bag or on a surface of the bagging station.

10. The system of claim 6, wherein the item data is generated via an item data generator configured to:

establish an origin of an x-y coordinate system;

receive measurements of each item from the multiple load cells;

determine a weight measurement at the location of the x-coordinate and the y-coordinate; and store the item data.

11. The method of claim 1, wherein the movement of the grouping of items is performed absent a notification to move the grouping of items, wherein the grouping of items being moved to the second bag rack on the bagging station causes the two-dimensional coordinates in the location data to be updated.

\* \* \* \* \*